July 21, 1964 M. GOLDMAN ETAL 3,141,912
PROCESS OF TREATING POLYMERIC FILM
Filed Aug. 24, 1960
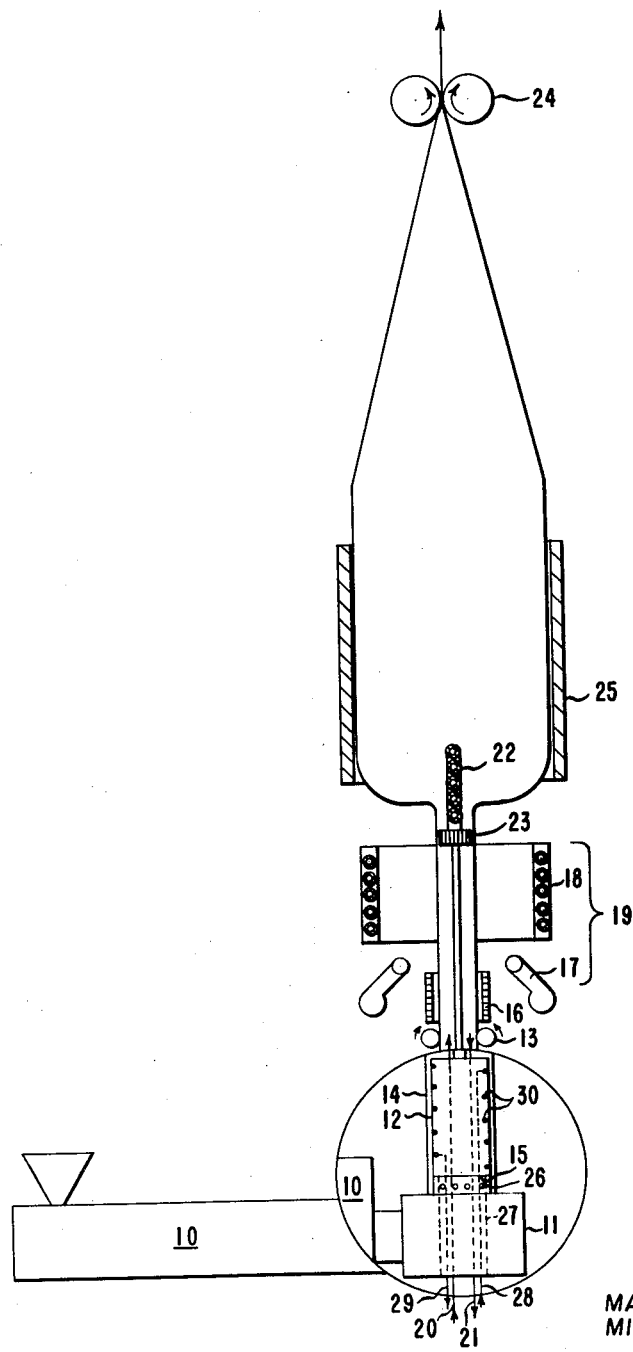
INVENTORS
MAX GOLDMAN
MIKLOS WALLENFELS
BY *Herbert M Wolfson*
ATTORNEY

United States Patent Office 3,141,912
Patented July 21, 1964

3,141,912
PROCESS OF TREATING POLYMERIC FILM
Max Goldman, Tonawanda, and Miklos Wallenfels, Buffalo, N.Y., assignors to E. I. du Pont de Nemours and Company, Wilmington, Del., a corporation of Delaware
Filed Aug. 24, 1960, Ser. No. 51,629
7 Claims. (Cl. 264—95)

This invention relates to the orientation of thermoplastic polymeric film in tubular form. More particularly, it relates to a method for orienting by a combination of expansion and longitudinal stretching to improve the properties of thermoplastic, polymeric, tubular film.

The idea of orienting under controlled conditions, particularly at a controlled temperature, to improve the physical properties of thermoplastic polymeric film, is not new. The idea of expanding a thermoplastic, polymeric, tubular film by providing gas under pressure within the tubular film is not new either. The problem, however, of maintaining control over the temperature of the tubular film prior to and during expansion of the film has also prevailed for a long time and is a problem that has discouraged the use of the expansion or blowing process for the orientation of polymeric film.

The object of the present invention is a novel method of achieving and maintaining the temperature of thermoplastic, polymeric, tubular film during expansion to provide a process for orienting such film. Another object is to provide a method that can be performed in a continuous manner for biaxially orienting, i.e. orienting in two mutually perpendicular directions, thermoplastic, polymeric, tubular film. Other objects will appear hereinafter.

The manner in which the objects of the invention are attained is set out in the following description and the drawing, in which:

The figure is a schematic view, partially in section, of an apparatus adapted to carry out the process of the present invention.

The objects are accomplished by a process which involves, first extruding thermoplastic polymeric material in the form of a tubular sheet or film heated to thermoplastic condition, i.e. in a formative state above its crystalline melting point; advancing the tubular sheet at a predetermined initial rate; quenching the tubular sheet by cooling the sheet quickly to a temperature below the formative state, preferably at least 20° C. below the orientation temperature range; maintaining sufficient pressure within the tubular sheet to prevent collapse and to provide, when the tubular sheet is heated to a temperature within its orientation temperature range, an expansion of at least 2 times the original diameter of the tubular sheet; heating the outside surface of the tubular sheet to a temperature below the orientation temperature range but no less than a temperature of 70%, preferably 80% of the lowest temperature of the orientation temperature range; heating the inside surface of the tubular sheet to a temperature within the orientation temperature range to expand the tubular sheet to a diameter at least 2 times, preferably 2–10 times its original diameter as extruded; advancing while expanding the heated tubular sheet at a rate at least 2 times, preferably 2–10 times the initial rate, preferably the ratio of the final advancing rate to the initial advancing rate being equal to the ratio of the final diameter to the extruded diameter of the tubular sheet; and, finally, cooling the tubular sheet while maintaining the sheet substantially at its expanded diameter.

The "orientation temperature range," as defined herein, refers to the temperature range in which molecular orientation of a polymeric film may be effected. This range lies somewhere below the melting temperature of a polymer that melts at a specific temperature or below the crystalline melting point of a crystalline polymer that melts over a range of temperatures. The crystalline melting point refers to the temperature at which the crystallites of a crystalline polymer are no longer detectable under X-ray examination when the solid polymer is heated until it melts.

For some crystalline polymers such as polyethylene, polypropylene and other polyhydrocarbons, the orientation temperature range may be the range of temperature over which the crystallites melt but below the temperature at which the crystallites are no longer detectable. In the case of polyesters such as polyethylene terephthalate and the like, the so-called "crystallizable" polymers, the orientation temperature range extends from about 10° C. to 40° C. above the second order transition temperature of the polymer. The second order transition temperature is that temperature at which an essentially amorphous polymer or one that can be quenched as an amorphous polymer but is crystallizable makes a transition from a glassy state to a rubbery state. It is in this rubbery state that the polymer in the form of a film or a filament can be oriented by stretching. The second order transition temperature varies with the molecular weight of the polymer and is defined more completely in U.S. Patent 2,578,899.

The specific orientation temperature range will vary from polymer to polymer but may be determined by experimentation or from the literature. In the following table, Table I, the orientation temperature range, the second order transition temperature and the crystalline melting point are given for some representative amorphous polymers and some "crystallizable" polymers that are amorphous as quenched.

TABLE I

| Polymer | Second Order Transition Temp. (° C.) | Crystalline Melting Point (° C.) | Orientation Temperature Range (° C.) |
|---|---|---|---|
| Polyethylene terephthalate | 70 | 255 | 85–110 |
| Polyethylene-2,6-naphthalate | 113 | 265 | 120–140 |
| Polytetramethylene-1,2-dioxybenzoate | 53 | 220 | 70–90 |
| Polyethylene-1,5-naphthalate | 71 | 225 | 80–100 |
| Polyhexamethylene adipamide | 45–50 | 250 | 65–75 |
| Polyhexamethylene sebacamide | 45–50 | 250 | 65–75 |
| Polycaprolactam | 45–50 | 250 | 65–75 |
| 70% Ethylene terephthalate/30% ethylene isophthalate copolymer | 51 | 170 | 70–90 |
| Polyvinyl chloride: | | | |
| No plasticizer | 105 | 170 | 115–145 |
| 5% plasticizer | 90 | 170 | 100–130 |
| 10% plasticizer | 75 | 170 | 85–115 |
| 15% plasticizer | 60 | 170 | 70–100 |
| 84% tetrafluorethylene/16% hexafluoropropylene copolymer | 85 | 295 | 265–280 |
| Polystyrene | None | [1] 88–120 | 88–110 |
| Polymethylmethacrylate | None | [1] 66–111 | 66–105 |

[1] Softening range rather than crystalline melting point since the polymer is only obtainable as an amorphous polymer.

In the following table, Table II, the orientation temperature range and the crystalline melting point are listed for some representative crystalline polymers.

TABLE II

| Polymer | Density @ 20° C. (gm./cc.) | Crystalline Melting Point (° C.) | Orientation Temperature Range (° C.) |
|---|---|---|---|
| Polypropylene | 0.8825 | 140 | 100–120 |
|  | 0.8912 | 150 | 120–140 |
|  | 0.9014 | 165 | 125–145 |
|  | 0.9092 | 173 | 135–160 |
|  | 0.9123 | 179 | 140–160 |
| Polyethylene | 0.90 | 98 | 50–80 |
|  | 0.92 | 112.5 | 80–110 |
|  | 0.95 | 134 | 120–130 |
| Polyvinyl fluoride | 1.38 | 193–198 | 175–185 |
| Polyvinylidene fluoride | 1.76 | 174 | 150–165 |
| Polyoxymethylene | 1.3–1.5 | 180–185 | 120–180 |

In the following table, Table III, the preferred conditions of this process for several particularly important polymers are listed.

TABLE III

| Polymer | Quench Temp. Range (° C.) | Temp. in Initial Heating Zone (° C.) | Temp. in Final Heating Zone (° C.) | Elongation Range (times original dimensions) |
|---|---|---|---|---|
| Polypropylene[1] | 0–40 | 130–145 | 150–159 | 2–10 |
| Polyethylene terephthalate | 20–50 | 60–80 | 85–110 | 2–6 |
| Polyethylene[2] | 0–40 | 80–120 | 100–130 | 2–10 |
| Polyvinyl chloride[3] | 20–40 | 65–80 | 85–115 | 2–6 |

[1] Density above 0.909 gms./cc.
[2] Density above 0.92 gms./cc.
[3] Plasticizer content of 0–15%.

Referring to the figure, which is a diagrammatic illustration of the process of this invention, the thermoplastic polymer is first heated to a temperature above its melting point in the extruder 10. The molten polymer, preferably at a temperature at least 10° C. above its melting point or crystalline melting point, is extruded through die 11 in the form of a tubular film 14, the tube having a wall thickness of anywhere from 15 to 85 mils. The tubular film is then drawn over but out of contact with a cooling mandrel 12 by means of the tube advancer 13. The tube advancer 13 is composed of two sets of driven rubber squeeze rolls which contact the surface of the cooled tubular film to advance the film at a predetermined initial rate. The tube advancer 13 also serves to prevent sway of the film and to insulate the freshly extruded film adjacent the die from the subsequently applied longitudinal tension. Instead of driven rolls, endless belts may be used as the tube advancer.

The cooling or quench mandrel 12 is a hollow metal cylinder insulated from the die by a non-metallic insulating disc 15. The disc has openings 26 around its periphery, the openings communicating with the atmosphere through conduit 27. Coils 30 communicating with inlet and outlet tubes 28 and 29 in the conduit, are disposed adjacent the interior surface of the mandrel. The coils 30 convey cooling water which serves to reduce the temperature of the tubular film to about room temperature, although any temperature from −10° C. to about 50° C. would be adequate to convert most thermoplastic polymeric films to a non-formative plastic state, i.e. a state where the film resists stretching. Since cooling tends to shrink the thermoplastic polymeric tubular film, the mandrel is preferably tapered to the contour of the shrinking film. If necessary, pressure relief areas such as those disclosed in application Serial No. 41,328, filed July 7, 1960, and assigned to the assignee of the present application may be provided to isolate the gas pressure downstream of the mandrel 12.

The solidified tubular film is then drawn through a guide ring 16, the ring serving to minimize sway of the tube. Drawing is accomplished by means of a set of nip rolls 24 rotating at a rate that is at least 2 times the rate of the tube advancer 13. Next, the film is advanced through the initial heating section 19. This section is composed of the forced air heaters 17 and the radiant heater 18 connected to a power source, not shown. The connecting wires are also brought in through the conduit 27. It should be understood that any other means that would serve to heat the outside surface of the tubular film would operate in this invention. The initial heating section 19 serves to heat the film to a temperature within about 70% of the lowest temperature of the orientation temperature range to just below the orientation temperature range of the thermoplastic polymer. The precise temperature to which the film is heated in the initial heating section 19 will depend upon several factors. For example, the greater the speed of the film, the higher the temperature to which the film must be heated. The greater the intensity of the final internal heater 22, the lower the temperature to which the film need be heated in the initial heating section 19. Placing the initial heating section outside the tubular enclosure of the film is critical to the present invention.

Air or other gaseous medium admitted through inlet 20 and vented through outlet 21 provides the pressure within the tubular film to prevent collapse of the film while the film is at a temperature below the orientation temperature range and to expand the tubular film a predetermined amount when the temperature of the film reaches the orientation temperature range. The amount of expansion is dependent upon the pressure within the film, the precise temperature within the orientation temperature range to which the film is brought, the rate of heating the film, the thickness of the film wall, etc., and can either be pre-set by one skilled in the art or set after experimentation.

The tubular film is brought to a temperature within the orientation temperature range and at which the film expands by means of the pencil-type, internal radiant heater 22 mounted on the internal guide ring 23. Heater 22 is connected to a power source by wires leading through the conduit 27 to a power source, not shown. The tubular film 14, immediately upon reaching the orientation temperature range, starts to expand due to the pressure within it and to elongate due to the relative rates of the nip rolls 24 and the tube advancer 13. However, as the tubular film expands, its inner surface gets farther and farther away from heater 22 and its outside surface approaches the cooling ring 25. This combination of factors serves to reduce the temperature of the film. When the temperature falls below the orientation temperature range, expansion and elongation cease. The resulting expanded and stretched tubular film is then cooled by continuing its passage through the cooling ring 25. Cooling ring 25 can contain coils to convey cooling water in its surface as in the quenching mandrel. It should be understood that neither the precise heating means nor the precise cooling means described or shown in the figure are to be construed as limitative in the present invention.

By adhering to the limits of the process of the present invention, several surprising results are at once apparent. The resulting biaxially oriented film does not display the usual magnified gauge variations normally accompanying film-blowing processes. That is, gauge variations, almost unavoidable during extrusion, are not magnified as in prior art blowing processes by the expansion process of the present invention. Another unexpected result is that polypropylene and other crystalline polymers which heretofore had suffered from "line drawing" when stretched by expanding the tubular film, do not suffer from this fatal shortcoming when subjected to the process of the present invention.

The following examples serve to illustrate the present invention, Example 1 being the best mode contemplated for practicing the invention.

*Example 1*

Molten polypropylene having a density of 0.906 [1] was

---
[1] "Pro-fax 6512E."

extruded at a temperature of 225° C. and at a rate of 10 pounds per hour from a 1-inch extruder through a 2⅛ inch circular die having a 45-mil lip opening. The apparatus was substantially that shown in the drawing. The extruded tubular film was quenched to the non-formative plastic state by being passed over a nominal 2-inch tapered internal mandrel at a temperature of about 10° C., the taper of the mandrel being 4 mils per inch. The tubular film was withdrawn from the die over the internal mandrel by a tube advancer operating at 2.5 feet per minute. Air was injected and vented to the atmosphere through connections in the end of the quench mandrel. The resulting open bubble system provided a pressure of 22 inches of water within the tubular film. As the tubular film cooled over the internal mandrel, it shrank in diameter. This shrinkage, together with the taper of the mandrel, served to prevent the air injected at the end of the mandrel from exerting pressure on the molten tubular film in the area adjacent the die.

After passing through the tube advancer, the tubular film was led through an external tapered guide ring 6 inches long and 2 inches in diameter to minimize sway. The tubular film was then passed into an initial heating zone where it was heated to a temperature of 130° C. The initial heating zone was composed of several external radiant heaters that surrounded the film and a forced air heater. The radiant heaters were each 12 inches high, 10 inches in diameter, rated at 6500 watts and operated at 25% capacity. The forced air heater, which was located just upstream of the radiant heaters, forced air at a temperature of about 160° C. and at a rate of about 1,200 feet per minute against the outside surface of the tubular film.

Immediately after passing through the initial heating zone, the tubular film was passed into the final heating zone where it was heated to a temperature of about 155° C. Heating was provided by a pencil-type internal radiant heater 7 inches long, rated at 650 watts, operated at 72% capacity and having a surface temperature of 620° C. At the internal pressure of 22 inches of water and at the temperature of 155° C., the tubular film stretched and expanded. Stretching of six times its original length was accomplished by a set of nip rolls that drew the film at a rate of 15 feet per minute. Expansion to a diameter of 12 inches took place due to the internal pressure of 22 inches of water at this temperature.

The major amount of cooling was accomplished by passing the expanded film through a water-cooled ring 10½ inches long and 12½ inches in diameter which served to cool the expanded and stretched film to a temperature of about 40° C. The tubular film which had been elongated six times in both the transverse and longitudinal directions was finally collapsed as it passed through the nip of a set of nip rolls and was finally wound on a roll.

The film having a thickness of 0.8 mil displayed the following properties:

|  | Longitudinal Direction[1] LD | Transverse Direction[2] TD |
|---|---|---|
| Tensile Strength (lbs./sq. in.) | 26,700 | 26,500 |
| Elongation (percent) | 94 | 68 |
| Initial Tensile Modulus (lbs./sq. in.) | 395,000 | 340,000 |
| Impact Strength (kgs.-cm./mil) | [3] 4.7 | |
| Shrinkage (percent) | 3.3 | 9.6 |

[1] In the direction of movement of the film through the apparatus.
[2] Perpendicular to the longitudinal direction.
[3] Independent of direction.

*Tensile strength, elongation* and *initial tensile modulus* are normally measured at 23.5° C. and 50% relative humidity, although they may also be measured at other specified temperatures and humidities. They are determined by elongating the film sample in an Instron tensile tester at a rate of 100% per minute until the sample breaks. The force applied at the break in p.s.i. is the tensile strength. The elongation is the percent increase in the length of the sample at breakage. Initial tensile modulus in p.s.i. is directly related to the film stiffness. It is obtained from the slope of the stress-strain curve at an elongation of 1%. Both tensile strength and initial tensile modulus are based upon the initial cross-sectional area of the sample.

*Pneumatic impact strength* or *impact strength* is the energy required to rupture a film. It is reported in kilograms-centimeters per mil thickness of the sample. The pneumatic impact strength is determined by measuring the velocity of a ball mechanically accelerated by air pressure, first in free flight and then in a flight impeded by rupturing the test sample. In this test, the film sample is 1¾" x 1¾". The projectiles are steel balls ½" in diameter and weighing 8.3 grams. The free flight velocity is 23 meters per second. The velocities are measured by timing photoelectrically the passage of the steel balls between two light beams set a definite distance apart. The pneumatic impact strength is measured by the loss in kinetic energy due to the rupturing of the test sample. It is calculated from the following formula:

$$Constant \times (square\ of\ velocity\ in\ free\ flight - square\ of\ velocity\ in\ impeded\ flight)$$

where the constant is directly proportional to the weight of the projectile and inversely proportional to the acceleration due to gravity. This test is carried out at 23° C. and 50% relative humidity and the test samples are conditioned for 24 hours at 23° C. and 50% relative humidity.

*Shrinkage* is a measure of the form-stability of the film. Ten sample strips, 2.5" x 5" each, from each direction, i.e. ten having the longer dimension running in the machine or longitudinal direction or the direction in which the film was extruded and ten having the longer dimension running in a direction transverse to the machine direction, are supported from two adjacent corners and suspended in boiling water for 1 second. The dimensional change is then noted, and percent shrinkage is calculated based on the original dimension.

*Examples 2–5*

Example 1 was repeated using different polymeric materials in substantially similar equipment as that shown in Example 1. The particular polymeric materials and the specific operating conditions are summarized in Table IV.

TABLE IV

| Example | 2 | 3 | 4 | 5 |
|---|---|---|---|---|
| Polymer | Esso (266C)[1] | Kopper Super Dylan 6015[2] | 75% Alathon 14, 25% A-71X[3] | Polyvinyl Chloride[4] |
| Extrusion Temp. (° C.) | 225 | 215 | 215 | 190 |
| Quench Temp. (° C.) | 25 | 25 | 25 | 25 |
| Initial Diameter (inches) | 2 | 2 | 2 | 2 |
| Initial Rate of Drawing (ft./min.) | 2.6 | 2.5 | 2.5 | 2.5 |
| Temp. of Film in Initial Heating Zone (° C.) | 125 | 115 | 100 | 80 |
| Surface Temp. of External Quartz Heater (° C.) | 250 | 280 | 320 | 200 |
| Bubble Pressure (inches of water) | 24 | 8 | 6 | 8 |
| Temp. of Film in Final Heating Zone (° C.) | 150 | 125 | 115 | 90 |
| Surface Temp. of Internal Radiant Heater (° C.) | 610 | 570 | 350 | 700 |
| Final Diameter (inches) | 10 | 12 | 10 | 4 |
| Final Rate of Drawing (ft./min.) | 13 | 14.5 | 12.5 | 8 |
| Amount of LD Stretch | 5× | 6× | 5× | 3.2× |
| Amount of TD Stretch | 5× | 6× | 5× | 2.0× |

[1] Linear polypropylene having a density of 0.902.
[2] Linear polyethylene having a density of 0.954.
[3] 75% of polyethylene having a density of 0.915 and 25% of polyethylene having a density of 0.958.
[4] A composition containing 92% polyvinyl chloride, 4% lauryl mercaptan and 4% beta-pinene.

The thickness and the physical properties of the films resulting in Examples 2–5 are presented in Table V.

TABLE V

| Example | 2 | 3 | 4 | 5 |
|---|---|---|---|---|
| Thickness (mils) | 1.2 | 0.8 | 0.9 | 1.0 |
| Tensil Strength (p.s.i.×10⁻³) LD/TD | 19.1/20.4 | 12.5/13.9 | 11.6/7.8 | 14.2/24.9 |
| Elongation (percent) LD/TD | 88/104 | 114/80 | 92/143 | 50/21 |
| Initial Tensile Modulus (p.s.i.×10⁻³) LD/TD | 219/232 | 242/328 | 57/55 | 405/602 |
| Impact Strength (kg.-cm./mil) LD/TD | 5.4 | 2.9 | 2.4 | 2.4 |
| Shrinkage (percent) LD/TD | 2.1/5.5 | 4.9/5.5 | 16/24 | 25/50 |

Having fully disclosed the invention, what is claimed is:

1. A process which comprises the steps, in sequence, of extruding thermoplastic polymeric material in the form of a tubular sheet in its formative state; advancing the tubular sheet at a predetermined initial rate; quenching the tubular sheet to a temperature below its formative state; maintaining sufficient pressure within the tubular sheet to prevent collapse and to provide, when the tubular sheet is heated to a temperature within its orientation temperature range, an expansion to a diameter of at least 2 times the original diameter of the sheet; heating the tubular sheet to a temperature between 70% of the lowest temperature of the orientation temperature range in degrees centigrade and just below the orientation temperature range of the polymeric material; thereafter, heating the tubular sheet internally from an internally disposed radiant heat source to a temperature within the orientation temperature range to expand the tubular sheet to a diameter at least 2 times its original diameter, said expansion being carried out while said tubular sheet is exposed to said heat source; advancing, while expanding, the heated tubular sheet at a rate of at least 2 times the initial rate of advancement; and cooling the tubular sheet while maintaining the sheet substantially at its expanded diameter.

2. A process which comprises the steps, in sequence, of extruding thermoplastic polymeric material in the form of a tubular sheet in its formative state; advancing the tubular sheet at a predetermined initial rate; quenching the tubular sheet to a temperature below its formative state; maintaining sufficient pressure within the tubular sheet to prevent collapse and to provide, when the tubular sheet is heated to a temperature within its orientation temperature range, an expansion to a diameter of at least 2 times the original diameter of the sheet; heating the tubular sheet externally to a temperature between 70% of the lowest temperature of the orientation temperature range in degrees centigrade and just below the orientation temperature range of the polymeric material; thereafter, heating the tubular sheet internally from an internally disposed radiant heat source to a temperature within the orientation temperature range to expand the tubular sheet to a diameter at least 2 times its original diameter, said expansion being carried out while said tubular sheet is exposed to said heat source; advancing, while expanding, the heated tubular sheet at a rate at least 2 times the initial rate of advancement; and cooling the tubular sheet while maintaining the sheet substantially at its expanded diameter.

3. A process as in claim 1 wherein the ratio of the final advancing rate to the initial advancing rate is equal to the ratio of the final diameter to the original diameter of the tubular sheet.

4. A process which comprises the steps, in sequence, of extruding polypropylene in the form of a tubular sheet heated to a temperature above 180° C.; advancing the tubular sheet at a predetermined initial rate; quenching the tubular sheet by cooling the sheet quickly to a temperature of 0° C.–40° C.; maintaining sufficient pressure within the tubular sheet to prevent collapse and to provide, when the tubular sheet is heated to a temperature within the orientation temperature range of polypropylene, an expansion to a diameter of at least 2 times the original diameter of the sheet; heating the tubular sheet to a temperature of 130° C.–145° C.; thereafter, heating the tubular sheet internally from an internally disposed radiant heat source to a temperature of 150° C.–159° C. to expand the tubular polypropylene sheet to a diameter of 2–10 times the original diameter of the sheet, said expansion being carried out while said tubular sheet is exposed to said heat source; advancing, while expanding, the heated tubular sheet at a rate of 2–10 times the initial rate of advancement; and cooling the tubular sheet while maintaining the sheet substantially at its expanded diameter.

5. A process which comprises the steps, in sequence, of extruding polyethylene terephthalate in the form of a tubular sheet heated to a temperature above 255° C.; advancing the tubular sheet at a predetermined initial rates; quenching the tubular sheet by cooling the sheet quickly to a temperature of 20° C.–50° C.; maintaining sufficient pressure within the tubular sheet to prevent collapse and to provide, when the tubular sheet is heated to a temperature within the orientation temperature range of polyethylene terephthalate, an expansion to a diameter of at least 2 times the original diameter of the sheet; heating the tubular sheet to a temperature of 60° C.–80° C.; thereafter, heating the tubular sheet internally from an internally disposed radiant heat source to a temperature of 85° C.–110° C. to expand the tubular polyethylene terephthalate sheet to a diameter of 2–6 times the original diameter of the sheet, said expansion being carried out while said tubular sheet is exposed to said heat source; advancing, while expanding, the heated tubular sheet at a rate of 2–6 times the initial rate of advancement; and cooling the tubular sheet while maintaining the sheet substantially at its expanded diameter.

6. A process which comprises the steps, in sequence, of extruding polyethylene in the form of a tubular sheet heated to a temperature above 150° C.; advancing the tubular sheet at a predetermined initial rate; quenching the tubular sheet by cooling the sheet quickly to a temperature of 0° C.–40° C.; maintaining sufficient pressure within the tubular sheet to prevent collapse and to provide, when the tubular sheet is heated to a temperature within the orientation temperature range of polyethylene, an expansion to a diameter of at least 2 times the original diameter; heating the tubular sheet to a temperature of 80° C.–120° C. but below the orientation temperature range of the polyethylene; thereafter, heating the tubular sheet internally from an internally disposed radiant heat source to a temperature of 100° C.–130° C. within the orientation temperature range of the polyethylene to expand the tubular polyethylene sheet to a diameter of 2–10 times the original diameter of the sheet, said expansion being carried out while said tubular sheet is exposed to said heat source; advancing, while expanding, the heated tubular sheet at a rate of 2–10 times the initial rate of advancement; and cooling the tubular sheet while maintaining the sheet substantially at its expanded diameter.

7. A process which comprises the steps, in sequence, of extruding polyvinyl chloride in the form of a tubular sheet heated to a temperature above 160° C.; advancing the tubular sheet at a predetermined initial rate; quenching the tubular sheet by cooling the sheet quickly to a temperature of 20° C.–40° C.; maintaining sufficient pressure within the tubular sheet to prevent collapse and to provide, when the tubular sheet is heated to a temperature within the orientation temperature range of polyvinyl chloride, an expansion to a diameter of at least 2 times the original diameter; heating the tubular sheet to a temperature of 65° C.–80° C.; thereafter, heating the tubular sheet internally from an internally disposed radiant heat source to a temperature of 85° C.–115° C. to expand the tubular polyvinyl chloride sheet to a diameter of 2–6 times the original diameter of the sheet, said expansion being carried out while said tubular sheet is exposed to said heat source; advancing, while expanding, the heated tubular sheet at a rate of 2–6 times the initial rate of advancement; and cooling the tubular sheet while maintaining the sheet substantially at its expanded diameter.

References Cited in the file of this patent

UNITED STATES PATENTS

| | | |
|---|---|---|
| 2,448,433 | Irons et al. | Aug. 31, 1948 |
| 2,452,080 | Stephenson | Oct. 26, 1948 |
| 2,583,329 | Eckert | Jan. 22, 1952 |
| 2,583,330 | Eckert | Jan. 22, 1952 |
| 2,708,772 | Moncrieff | May 24, 1955 |
| 2,862,234 | Gerber | Dec. 2, 1958 |
| 2,947,032 | Taylor | Aug. 2, 1960 |
| 2,961,711 | Diedrich et al. | Nov. 29, 1960 |
| 2,979,777 | Goldman | Apr. 18, 1961 |
| 2,987,767 | Berry et al. | June 13, 1961 |

FOREIGN PATENTS

| | | |
|---|---|---|
| 840,191 | Great Britain | July 6, 1960 |
| 1,240,285 | France | July 25, 1960 |